United States Patent
Yueh

(10) Patent No.: US 9,514,140 B2
(45) Date of Patent: Dec. 6, 2016

(54) DE-DUPLICATION BASED BACKUP OF FILE SYSTEMS

(71) Applicant: Delphix Corporation, Menlo Park, CA (US)

(72) Inventor: Jedidiah Yueh, Menlo Park, CA (US)

(73) Assignee: Delphix Corporation, Menlo Park, CA (US)

( * ) Notice: Subject to any disclaimer, the term of this patent is extended or adjusted under 35 U.S.C. 154(b) by 381 days.

(21) Appl. No.: 14/040,459

(22) Filed: Sep. 27, 2013

(65) Prior Publication Data

US 2014/0025637 A1    Jan. 23, 2014

Related U.S. Application Data

(63) Continuation of application No. 13/183,131, filed on Jul. 14, 2011, now Pat. No. 8,548,944.

(60) Provisional application No. 61/364,652, filed on Jul. 15, 2010.

(51) Int. Cl.
| | |
|---|---|
| G06F 17/30 | (2006.01) |
| G06F 11/14 | (2006.01) |
| G06F 7/00 | (2006.01) |
| G06F 17/00 | (2006.01) |

(52) U.S. Cl.
CPC .......... *G06F 17/30088* (2013.01); *G06F 7/00* (2013.01); *G06F 11/1435* (2013.01); *G06F 11/1453* (2013.01); *G06F 17/00* (2013.01); *G06F 2201/84* (2013.01)

(58) Field of Classification Search
None
See application file for complete search history.

(56) References Cited

U.S. PATENT DOCUMENTS

| | | |
|---|---|---|
| 4,853,843 A | 8/1989 | Ecklund |
| 5,634,053 A | 5/1997 | Noble et al. |
| 5,680,608 A | 10/1997 | Chang et al. |
| 5,680,618 A | 10/1997 | Freund |
| 5,819,292 A | 10/1998 | Hitz et al. |
| 5,842,222 A | 11/1998 | Lin et al. |
| 6,304,882 B1 | 10/2001 | Strellis et al. |
| 6,523,036 B1 | 2/2003 | Hickman |
| 6,557,012 B1 | 4/2003 | Arun et al. |
| 6,883,083 B1 | 4/2005 | Kemkar |
| 6,920,457 B2 | 7/2005 | Pressmar |
| 7,107,385 B2 | 9/2006 | Rajan et al. |
| 7,197,491 B1 | 3/2007 | Chou et al. |
| 7,222,172 B2 | 5/2007 | Arakawa et al. |
| 7,225,204 B2 | 5/2007 | Manley et al. |
| 7,269,607 B2 | 9/2007 | Cotner et al. |

(Continued)

FOREIGN PATENT DOCUMENTS

| | | |
|---|---|---|
| CN | 1770088 A | 5/2006 |
| CN | 101286127 A | 10/2008 |

(Continued)

OTHER PUBLICATIONS

"FlexVol™ abd FlexClone™ Software," Datasheet, Network Appliance, Inc., 2004, 2 Pages.

(Continued)

*Primary Examiner* — Jay Morrison
(74) *Attorney, Agent, or Firm* — Fenwick & West LLP

(57) ABSTRACT

File system backups are performed by copying information describing changes in the file system since a previous point in time. To restore data, a virtual restored file system (VRFS) structure is created corresponding to a snapshot of data copied from the file system that is stored in the backup file system. A client can read the data stored in the backup file system pointed at by the VRFS structure as well as write to the backup file system. Multiple clients can share blocks of data stored on the backup file system via the same VRFS structure or via multiple VRFS structures. If a client writes to a data block pointed at by a VRFS, a copy of the data block is made to which the client makes changes so that the data in the original data blocks is saved for other clients.

18 Claims, 10 Drawing Sheets

(56) References Cited

U.S. PATENT DOCUMENTS

| | | |
|---|---|---|
| 7,334,094 B2 | 2/2008 | Fair |
| 7,334,095 B1 | 2/2008 | Fair et al. |
| 7,373,364 B1 | 5/2008 | Chapman |
| 7,386,695 B2 | 6/2008 | Fuente |
| 7,409,511 B2 | 8/2008 | Edwards et al. |
| 7,457,982 B2 | 11/2008 | Rajan |
| 7,539,836 B1 | 5/2009 | Klinkner |
| 7,587,563 B1 | 9/2009 | Teterin et al. |
| 7,590,660 B1 | 9/2009 | Richards et al. |
| 7,631,021 B2 | 12/2009 | Sarma et al. |
| 7,653,665 B1 | 1/2010 | Stefani et al. |
| 7,653,794 B2 | 1/2010 | Michael et al. |
| 7,743,035 B2 | 6/2010 | Chen et al. |
| 7,757,056 B1 | 7/2010 | Fair |
| 7,779,051 B2 | 8/2010 | Friedlander et al. |
| 7,809,769 B2 | 10/2010 | Butcher et al. |
| 7,822,758 B1 | 10/2010 | Prakash et al. |
| 7,827,366 B1 | 11/2010 | Nadathur et al. |
| 7,856,424 B2 | 12/2010 | Cisler et al. |
| 7,877,357 B1 | 1/2011 | Wu et al. |
| 7,895,228 B2 | 2/2011 | Cragun et al. |
| 7,937,547 B2 | 5/2011 | Liu et al. |
| 7,941,470 B2 | 5/2011 | Le et al. |
| 7,953,749 B2 | 5/2011 | Sinha et al. |
| 7,996,636 B1 | 8/2011 | Prakash et al. |
| 8,037,032 B2 | 10/2011 | Pershin et al. |
| 8,150,808 B2 | 4/2012 | Zha et al. |
| 8,255,915 B1 | 8/2012 | Blanding et al. |
| 8,280,858 B2 | 10/2012 | Ahrens et al. |
| 8,311,988 B2 | 11/2012 | Cisler et al. |
| 8,341,119 B1 | 12/2012 | Roussos et al. |
| 8,532,973 B1 | 9/2013 | CaraDonna et al. |
| 8,775,663 B1 | 7/2014 | Singh |
| 2002/0083037 A1 | 6/2002 | Lewis et al. |
| 2002/0143764 A1 | 10/2002 | Martin et al. |
| 2003/0204597 A1 | 10/2003 | Arakawa et al. |
| 2004/0054648 A1 | 3/2004 | Mogi et al. |
| 2005/0114701 A1 | 5/2005 | Atkins et al. |
| 2006/0140115 A1 | 6/2006 | Timus et al. |
| 2006/0242381 A1 | 10/2006 | Shatskih et al. |
| 2007/0219959 A1 | 9/2007 | Kanemasa |
| 2007/0260628 A1 | 11/2007 | Fuchs et al. |
| 2007/0294215 A1 | 12/2007 | Boss et al. |
| 2008/0005201 A1 | 1/2008 | Ting et al. |
| 2008/0034268 A1 | 2/2008 | Dodd et al. |
| 2008/0037553 A1 | 2/2008 | Gilmartin et al. |
| 2008/0154989 A1 | 6/2008 | Arman |
| 2008/0183973 A1 | 7/2008 | Aguilera et al. |
| 2008/0247314 A1 | 10/2008 | Kim et al. |
| 2008/0256314 A1 | 10/2008 | Anand et al. |
| 2008/0306904 A1 | 12/2008 | Fukuda et al. |
| 2008/0307345 A1 | 12/2008 | Hart et al. |
| 2009/0019246 A1 | 1/2009 | Murase |
| 2009/0080398 A1 | 3/2009 | Mahany et al. |
| 2009/0132611 A1 | 5/2009 | Brown et al. |
| 2009/0132616 A1 | 5/2009 | Winter et al. |
| 2009/0144224 A1 | 6/2009 | Phan et al. |
| 2009/0177697 A1 | 7/2009 | Gao et al. |
| 2009/0222496 A1 | 9/2009 | Liu et al. |
| 2009/0292734 A1 | 11/2009 | Miloushev et al. |
| 2010/0070476 A1 | 3/2010 | O'Keefe et al. |
| 2010/0125844 A1 | 5/2010 | Mousseau et al. |
| 2010/0131959 A1 | 5/2010 | Spiers et al. |
| 2010/0174684 A1 | 7/2010 | Schwaab et al. |
| 2010/0250880 A1* | 9/2010 | Mimatsu ............. G06F 11/1451 711/162 |
| 2011/0004586 A1 | 1/2011 | Cherryholmes et al. |
| 2011/0004676 A1 | 1/2011 | Kawato |
| 2011/0093435 A1 | 4/2011 | Zha et al. |
| 2011/0093436 A1 | 4/2011 | Zha et al. |
| 2011/0161973 A1 | 6/2011 | Klots et al. |
| 2011/0208755 A1* | 8/2011 | Fiske ................. G06F 11/1469 707/751 |

FOREIGN PATENT DOCUMENTS

| | | |
|---|---|---|
| CN | 101441582 A | 5/2009 |
| CN | 101473309 A | 7/2009 |
| JP | 2000047919 A | 2/2000 |
| JP | 2004-110218 | 4/2004 |
| JP | 2005532611 A | 10/2005 |
| JP | 2009-530756 | 8/2009 |

OTHER PUBLICATIONS

"FlexClone" Datasheet, Network Appliance, Inc., 2008, 2 Pages.

Hansen, J., et al., "Lithium: Virtual Machine Storage for the Cloud," in SoCC'10—Proceedings of the 1st ACM Symposium on Cloud Computing, Jun. 10-11, 2010, 21 Pages, [online] [retrieved on Nov. 16, 2011]. Retrieved from the Internet <URL: http://vmwareJe/files/pdf/partners/academiC/ vmware-academic-socc055-hansen-wp.pdf >.

Meeks, J., "An Oracle Technical White Paper-Oracle Data Guard with Oracle Database 11g Release 2," Oracle, Sep. 2009, 20 Pages.

"NetApp SnapMirror," Datasheet, Network Appliance, Inc., 2008, 2 Pages.

"NetApp Snapshot Technology," Datasheet, Network Appliance, Inc., 2004, 1 Page.

"NetApp SnapManager for Oracle," Datasheet, Network Appliance, Inc., 2008, 2 Pages.

Prasad, STS., et al., "Virtual Database Technology, XML, and the Evolution of the Web", IEEE Computer Society Technical Committee on Data Engineering, 1998, pp. 1-5.

Rajaraman, A., et al., "Virtual Database Technology: Transforming the Internet into a Database", IEEE Internet Computing, Jul./Aug. 1998, pp. 55-58.

Sadagopan, S., "Introduction to WebSphere Federation Server", IBM Data Management Solutions, 2005, pp. 1-45.

"Virtual Databases", Jan. 7, 2008, 4 Pages, [online] [Retrieved on Sep. 19, 2011] Retrieved from the internet <URL:http://www.db2dean.com/PreviouslVirtualDB.html>.

Wilson, A.J., et al., "Multiple Virtual Databases to Support Multiple VOS in R-GMA", CCLRC-Rutherford Appleton Laboratory, UK, 2006, 3 Pages.

PCT International Search Report and Written Opinion, PCT/US2011/044209, Dec. 6, 2011, 7 Pages.

PCT International Search Report and Written Opinion, PCT/US2010/052963, Dec. 10, 2010, 16 Pages.

PCT International Search Report and Written Opinion, PCT/US2010/052960, Dec. 10, 2010, 17 Pages.

PCT International Search Report and Written Opinion, PCT/US2010/060536, Feb. 28, 2011, 12 Pages.

Office Action for U.S. Appl. No. 13/316,263, Jan. 14, 2013, 7 Pages.

Office Action for U.S. Appl No. 12/647,337, Nov. 26, 2012, 14 Pages.

Supplementary European Search Report for European Patent Application No. EP 10825453, Jun. 28, 2013, 8 Pages.

Supplementary European Search Report for European Patent Application No. EP 10825452, Jun. 28, 2013, 8 Pages.

Office Action for Australian Patent Application No. AU 2011278970, Nov. 7, 2013, 3 Pages.

Office Action for Japanese Patent Application No. P2012-535259, Nov. 26, 2013, 8 Pages.

Office Action for U.S. Appl No. 13/329,132, Oct. 22, 2013, 10 Pages.

Office Action for U.S. Appl No. 13/183,131, Oct. 26, 2012, 19 Pages.

Harbow, L., "Precisely administrate the virtual environment of hybrid type, Part 2: Thorough review of top 5 products of "High-availability plus Disaster-Recovery" for the virtual environment," Computerworld, Japan, Kabushiki Kaisha IDG Japan, Jan. 1, 2009, vol. 6, No. 1, pp. 42-51. (English Translation Is Not Readily Available).

Chapman et al., "SnapMirror® Best Practices Guide, NetApp, Inc. Technical Report TR-3446," Apr. 2006, 63 Pages.

Edwards, et al., "FlexVol: Flexible, Efficient File Volume Virtualization in WAFL," Jun. 22, 2008, 22 Pages.

(56) References Cited

OTHER PUBLICATIONS

IBM, "IBM System Storage SAN Volume Controller Software V4.3.0 introduces space-efficient VDisks and VDisk mirroring," IBM United States Announcement 208-114, May 13, 2008, 17 Pages.
Microsoft, "Microsoft Developer's Network, Pages and Extents," Microsoft Corporation ("Pages and Extents") Sep. 2007, 2 Pages.
Mullins, "Excerpts of DB2 Developer's Guide, Fifth Ed." May 2004, 5 Pages.
NetApp, 2007 NetApp, Inc., Data ONTAP 7.1 Data Protection Online Backup and Recovery Guide, NetApp Technical Doc, Jan. 12, 2007, pp. 508.
NetApp, "Datasheet FlexClone," NetApp Technical Doc, 2008, 2 Pages.
NetApp, "Datasheet FlexVol™ and FlexClone™ Software," NetApp Technical Doc, 2004, 2 Pages.
Netapp, "Datasheet Netapp SnapManager for Oracle," NetApp Technical Doc, 2008, 2 Pages.
NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS The File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.
European Extended Search Report, European Application No. 11807578.7, Sep. 10, 2014, 8 pages.
Chinese Second Office Action, Chinese Application No. 201180043780.2, Oct. 20, 2014, 6 pages.
Chinese Second Office Action, Chinese Application No. 201080058431.3, Dec. 16, 2014. 5 pages.
Pan, A. et al, "A Virtual Database Management System for the Internet", 2002, 10 pages.
Office Action for Chinese Patent Application No. CN 201080058431.3, May 7, 2014, 24 Pages.
Office Action for Chinese Patent Application No. CN 201180043780.2, Apr. 3, 2014, 8 Pages. English Translation is not readily available.
Boppana, U., "Using FlexClone to Clone Files and LUNs," NetApp Technical Report, Mar. 2010, 32 Pages.
Creek, T., "Applications for Writeable LUNs and LUN Cloning in Oracle Environments," NetApp, Technical Report, Jun. 2003, 10 Pages.
Degwekar, A., "Using SnapMirror with SnapDrive for UNIX," NetApp Technical Report, 2007, 11 Pages.
GMANE, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.
GMANE, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.
GMANE, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.
GMANE, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.
GMANE, Discussion regarding "ZFS snapshot improvement," From the zfs-discuss@opensolaris.org mailing list, May 10, 2006, 1 Page, Can be retrieved at <URL:http://article.gmane.org/gmane.os.solaris.opensolaris.zfs/232/match=snapshot>.
GMANE, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.
Higgins, B., et al., "Backup and Recovery Snap Manager for SQL Server," DLA Piper, Nov. 2008, 37 Pages.
Hitz, D., et al., "File System Design for an NFS File Server Appliance," Technical Report, USENIX, Winter 1994, 23 Pages.
Jackson, J., "ZFS: The future for storage networks?; File system has massive capacity, but licensing issues and architectural concerns persist," Government Computer News, Media, Inc., Jun. 25, 2007, 2 Pages.
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.

(56) References Cited

OTHER PUBLICATIONS

Merrill, J., et al., "SnapVault Best Pratices Guide," NetApp Technical Report, 2008, 29 Pages.
Lal, J., et al., "DB2: Cloning a Database using NetApp FlexClone Technology," NetApp, Apr. 30, 2006, 60 Pages.
Nadgir, N., "Databases and ZFS," Oracle Blog, Sep. 25, 2006, 8 Pages, Can be retrieved from <URL:https://blog.oracle.com/realneel/entry/zfs_and_databases>.
Network Appliance, Inc., "Data ONTAP 7.2 Commands: Manual Page Reference, vol. 1," May 16, 2008, 615 Pages.
Network Appliance, Inc., "NetApp Data Management for Decision Support Systems," 2005-2010, 4 Pages.
Network Appliance, Inc., "Flexvol and Flexclone Software," 2006, 2 Pages.
Network Appliance, Inc., "SnapManager 3.0 for Oracle Installation and Administration Guide," Nov. 2008, 294 Pages.
Network Appliance, Inc., "SnapManager 2.2 for Oracle Installation and Administration Guide," Nov. 2007, 310 Pages.
Network Appliance, Inc., "SnapManager 5.0 for Microsoft SQL Server Installation and Administration Guide," Oct. 2008, 492 Pages.
Network Appliance, Inc., "Network Appliance Snapmirror Software," 2006, 2 Pages.
Oracle, "Oracle Database Backup and Recovery User's Guide," 11g Release 1(11.1), Aug. 2008, 598 Pages.
Osuna, A., "An Introduction to FlexClone Volumes" Redbooks, IBM, 2006, 50 Pages.
Osuna, A., "Using IBM DB2 UDB with IBM System Storage N series" Redbooks, IBM, Dec. 2006, 136 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.
Sadagopan, P., et al., "Oracle Fusion Middleware DR Solution Using NetApp Storage," NetApp Technical Report, May 2008, 38 Pages.
Schuettinger, S., "NetApp Technical Report—Rapid Deployment of Oracle Database 11g Using VMWare Infrastructure and NetApp Flexclone," NetApp, Jan. 2008, 24 Pages.
Schuettinger, S., "Helping DBAs Become More Efficient NetApp Efficiency and Manageability Advantages," NetApp White Paper, Jul. 2009, 12 Pages.
Sun Microsystems, Inc., "ZFS the File System of the Future," 19 Pages. [No Publication Date].
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.

"ZFS Snapshot and Amazon S3 (Part 2 of 2)," Paul's Blog 3.0 (Release Candidate), Oracle, 2007, 5 Pages.
Kakinoki, T., et al., "Query Language for Enterprise Data Integration in SaaS Envrionment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).
Notice of Grounds for Rejection for Japanese Patent Application No. P2014-155597, Apr. 21, 2015, 5 Pages.
$3^{rd}$ Office Action for Chinese Patent Application No. CN 201080058431.3, Apr. 17, 2015, 6 Pages.
Extended European Search Report for European Patent Application No. EP10839995.7, Mar. 2, 2015, 6 Pages.
Office Action for Australian Patent Application No. AU 2010310828, Mar. 17, 2014, 3 Pages.
Office Action for Australian Patent Application No. AU 2010310827, Mar. 20, 2014, 3 Pages.
Office Action for U.S. Appl. No. 13/329,132, Apr. 14, 2014, 9 Pages.
Office Action for U.S. Appl. No. 12/647,337, Jun. 10, 2014, 10 Pages.
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, Case IPR2015-00108, U.S. Pat. No. 8,566,361 B2, May 11, 2016, 57 Pages.
Office Action for Korean Patent Application No. KR 10-2012-7012816, Nov. 25, 2015, 5 Pages.
Office Action for Korean Patent Application No. KR 10-2012-7012806, Nov. 25, 2015, 7 Pages.
Office Action for Canadian Patent Application No. CA 2,778,415, Nov. 12, 2015, 3 Pages.
Communication Pursuant to Article 94(3) EPC for European Patent Application No. EP 10825453.3, Oct. 1, 2015, 9 Pages.
Office Action for Canadian Patent Application No. CA 2,804,372, Apr. 11, 2016, 3 Pages.

\* cited by examiner

DE-DUPLICATION BASED BACKUP OF FILE SYSTEMS

CROSS REFERENCES TO RELATED APPLICATIONS

This application is a continuation of U.S. patent application Ser. No. 13/183,131 filed on Jul. 14, 2011, which claims the benefit of U.S. Provisional Patent Application No. 61/364,652 filed Jul. 15, 2010, which is incorporated by reference in its entirety.

BACKGROUND

This invention relates generally to backup and restore of file systems, and in particular to storage efficient backup.

File systems provide permanent storage for data that is critical to an organization. Therefore, file systems form an important part of an organization's information technology. File systems are used for persistent storage of data by applications used in an organization, for example, email servers, document management systems, source code management systems and the like. Organizations make copies of the data stored in the file systems to avoid loss of data in case the original data in the file system is destroyed or corrupted. The process of making copies of the data is called a backup. Conventional systems that perform backups of data store the data in storage devices with large storage capacity, for example, magnetic tapes. These devices typically have slow access time. Conventional systems restore data from the backup storage in case of loss of data stored in the original file system. The process of restoring data of a large file system can take significant amount of time resulting in loss of business during the time the data is unavailable.

SUMMARY

Embodiments perform backups of a file system by copying changed blocks of data from the file system to a storage system. In case of loss of data or if the source file system is unavailable, a virtual restored file system (VRFS) structure is created using blocks of data stored in the storage system. The VRFS structure points at data blocks copied at various points in time. Since only changed blocks of data are stored in the storage system, the amount of data copied during backup is small. Also restoration of data is efficient because creation of the VRFS structure takes significantly less time than conventional restoring of file systems from a backup storage device. Furthermore, a client can directly read or write in the storage system while the source file system is down, instead of waiting for data to be restored on another file system.

In an embodiment, the backup system receives data blocks for a plurality of point-in-time copies of a source file system. The backup system stores the data blocks in a storage system. A data block can be associated with multiple point-in-time copies, for example, if a data block did not change since a previous point-in-time copy was obtained, the data block may be associated with the previous point-in-time copy as well as with a subsequent point-in-time copy. The backup system receives a request to restore information from the source file system for a target system. The backup system generates a virtual restored file system by linking a set of files to stored data blocks of the storage system and mounting the set of files on the target system.

In an embodiment, the backup file system performs backups of multiple source file systems. In an embodiment, a client can update the data stored on the backup file system pointed at by the VRFS structure. Multiple clients can share blocks of data stored on the backup file system via the same VRFS structure or via multiple VRFS structures. If a client writes to a data block pointed at by a VRFS, the changed data block is copied. This allows the original data blocks to be used by other clients.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
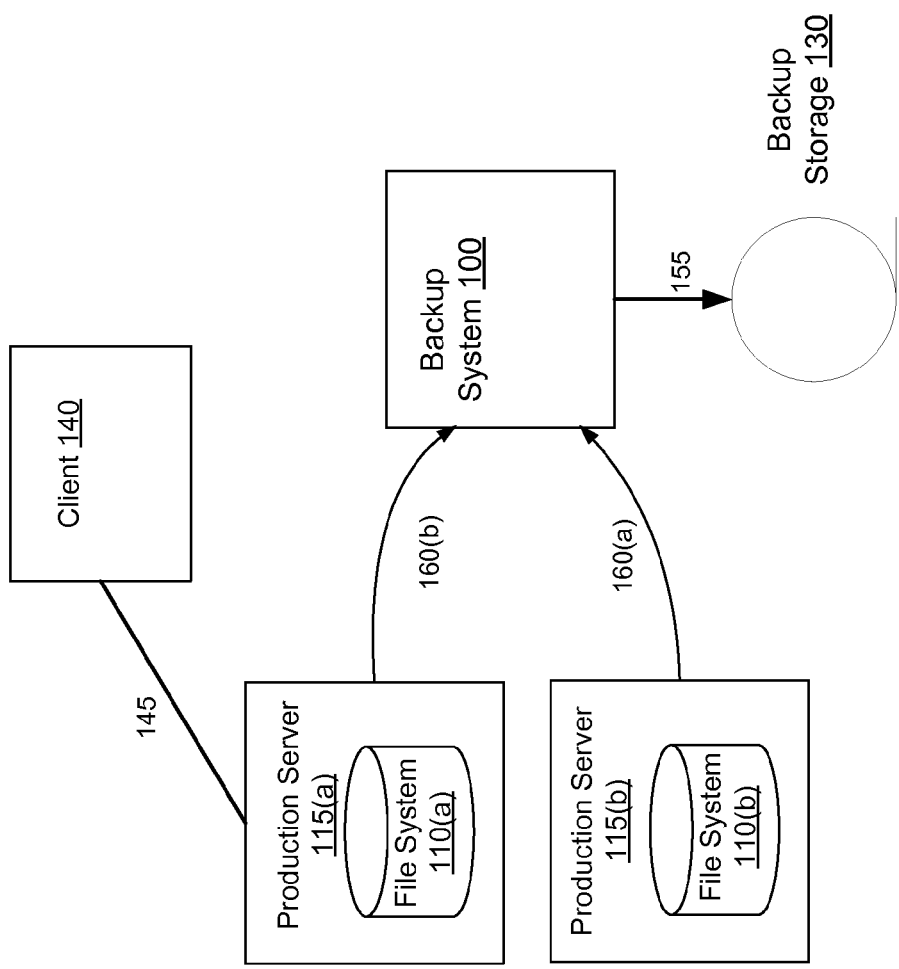
FIG. 1(a) (prior art) shows a conventional approach towards performing backups of file systems using a backup storage.

FIG. 1(a) shows a conventional approach towards performing backups of file systems storing data, for example, data used by production servers 115. Multiple file systems 110 can be backed up using a single backup system 100. Clients 140 access the data stored in file systems 110 by interacting 145 with the production server 115. The client 140 that accesses the file system 115 can be executing on a computer system separate from the production server 115 or it can be a program executing within the production server 115. The data from the file systems 110 is periodically copied 160 to the backup system 100. The backup system 100 stores the backup data it receives on a backup storage device 130, for example, a magnetic tape storage device.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

Figure 1B:
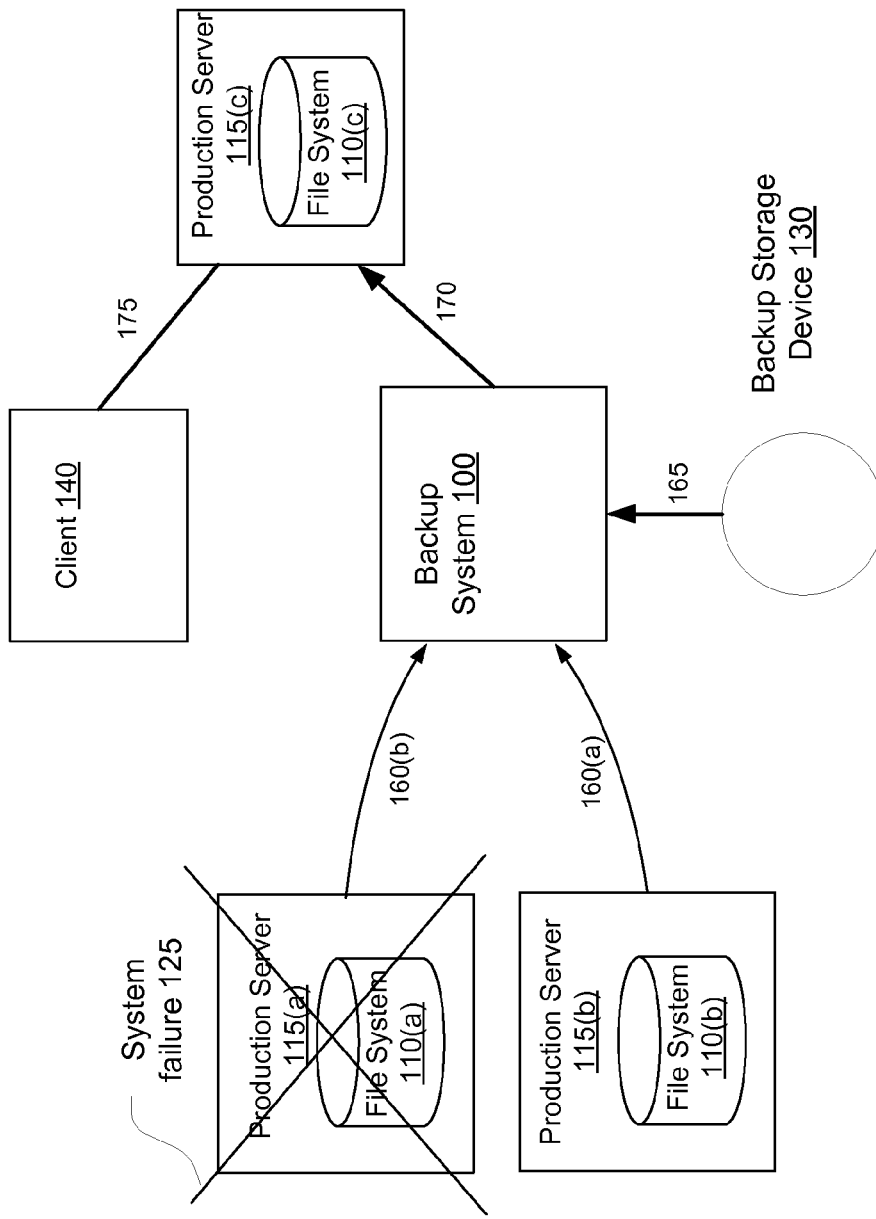
FIG. 1(b) (prior art) shows a conventional approach towards making data stored in a backup storage available for use in case of loss of data of the original file system.

FIG. 1(b) illustrates the conventional approach towards making data available from a backup system 100 using a restore operation. If there is a system failure 125 of the production server 115(a) or the file system 110(a), the client 140 is unable to use the data of the file system 110(a). The latest backup of the data from file system 110(a) is typically retrieved 165 by the backup system 100 from the backup storage 130 and restored 170 onto a file system 110(c). The client 140 can use 175 the data available on the file system 110(c), which represents a recent copy of the data from the file system 110(a). Typically, the performance of backup storage devices 130 is slower compared to storage devices used for file systems 110 of production system. As a result, the overall time taken to restore the data from the backup storage device 130 to the file system 110(c) can be significant, resulting in loss of potential business during the restore operation.

Figure 2A:
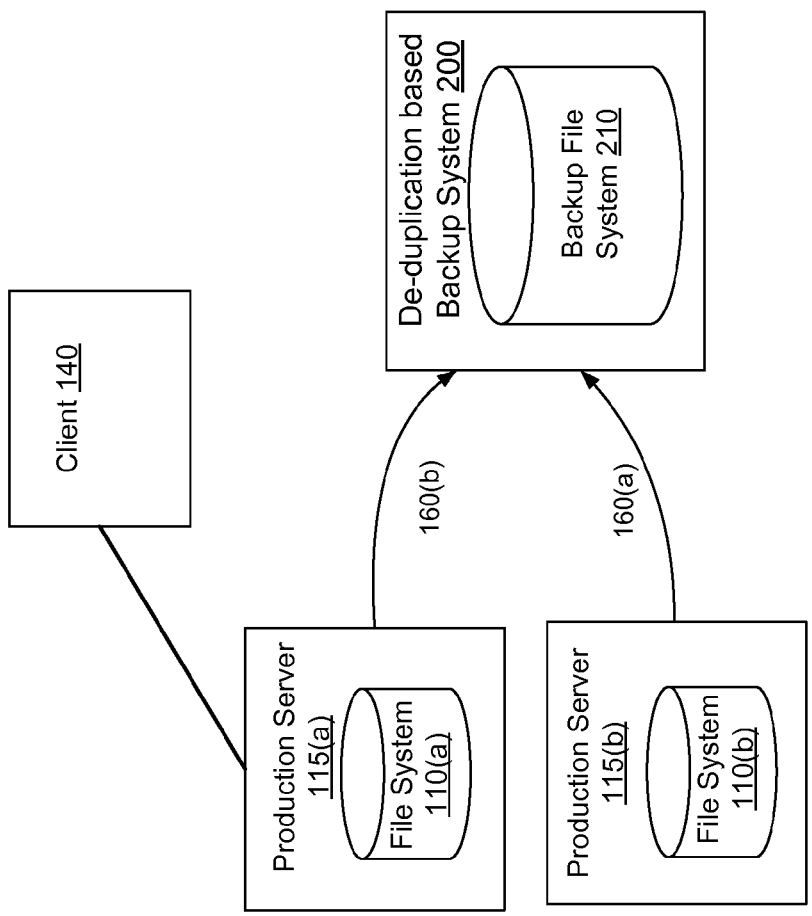
FIG. 2(a) is a diagram illustrating how backups are performed using a de-duplication based backup system, in accordance with an embodiment of the invention.

FIG. 2 illustrates a de-duplication based backup system 200 that eliminates the slow restore operation 170 for making data available in case of file system failures. As shown in FIG. 2(a), the de-duplication based backup system 200 receives from the file systems 110, blocks of data that have changed since a previous point in time. A block of data can store any information in the file system including data, executable program code, or instructions. In one embodiment, the changed blocks of data are received periodically. In these embodiments, each set of data blocks received by the de-duplication based backup system 200 corresponds to data blocks that changed since the last time the blocks were extracted from the file system 110. The operation of receiving the blocks of data from the production server is also referred to as the changed-block copy operation. In an embodiment, the changed blocks of data can be sent to the de-duplication based backup system 200 by an agent running on the production server 110. That agent can either identify changed files and portions of files (data blocks), by either operating at the file system level or at a volume level. The data blocks may or may not be fixed in size.

Alternatively, the de-duplication based backup system 200 sends a request to execute application programming interface (API) calls using libraries on the production server 115 to retrieve the changed blocks. In this configuration there is no need to have a backup agent on the production server 115 since the process is initiated and controlled by the de-duplication based backup system 200. A de-duplication based backup system 200 that does not require a backup agent on the production server is called an agent-less backup system. The de-duplication based backup system 200 stores the changed blocks of data in a backup file system 210. Typically, the amount of data corresponding to the changed blocks of the file system 110 is significantly less than the entire data of the file system 110. As a result the amount of data stored in the backup file system 210 can be significantly less than the amount corresponding to a full backup of the file system as shown in FIG. 1. That amount can be further reduced via compression or other data reduction techniques, such as using hashes as pointers to already stored identical blocks. Accordingly, the backup file system 210 can utilize a storage device that is significantly faster than a typical backup storage device 130. In an embodiment, the backup file system can be stored on a storage device that is at least as fast as the storage device used by the file system 110. For example, the backup file system 210 can be stored on a hard drive or a solid state drive (SSD). Storing the backup data on a fast storage device enables the possibility of allowing applications running on clients 140 to directly access the data stored in the de-duplication based backup system 200 in case the original file system 110 isn't available without significantly degrading the performance of those applications.

Figure 2B:
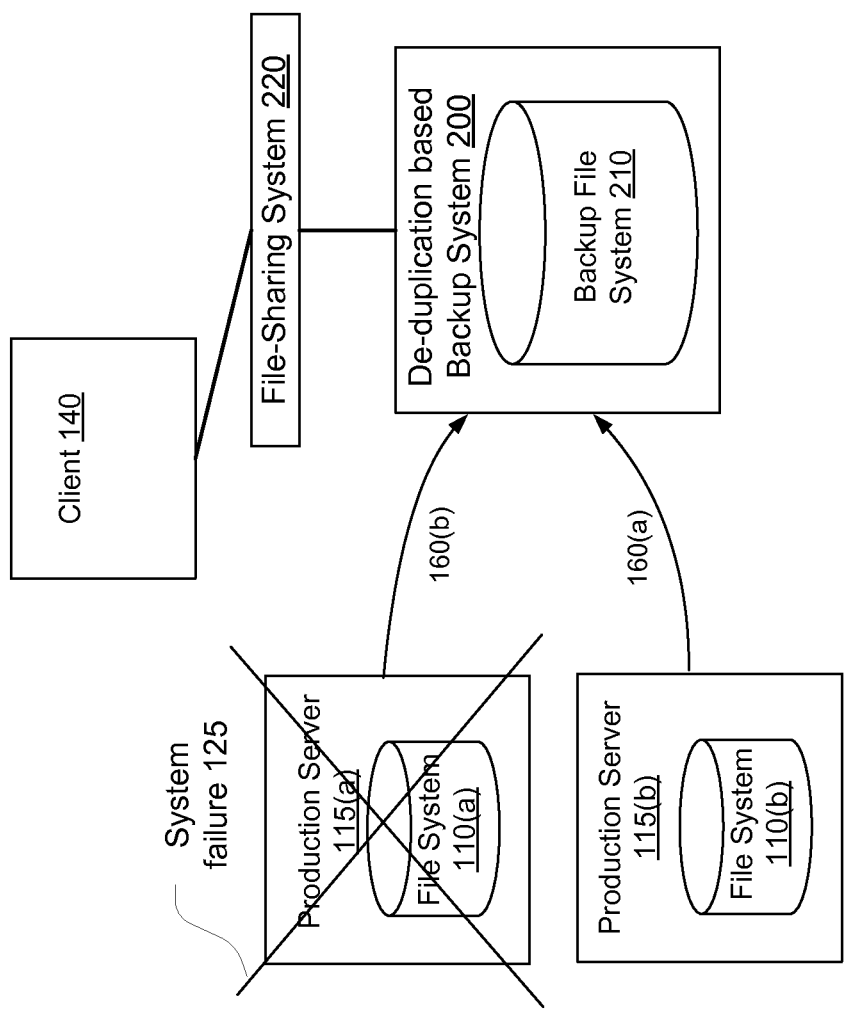
FIG. 2(b) is a diagram illustrating how data backed up using a de-duplication based backup system is made available for use by a client in case of loss of data, in accordance with an embodiment of the invention.

FIG. 2(b) illustrates how a de-duplication based backup system 200 makes data available for a client 140 to use. If there is a failure 125 of the file system 110(a) or the production server 115(a) the client 140 can directly access the data stored in the de-duplication based backup system 200. The de-duplication based backup system 200 presents a set of data blocks that correspond to the latest data of the file system 110(a). In an embodiment, the client can request the de-duplication based backup system 200 to provide access to data corresponding to a particular point in time that is different from the latest point in time. The data blocks corresponding to a point in time may be presented to a server and operating system as either a network mounted file system (e.g. over NFS), or as a disk volume (e.g. over FC or iSCSI).

The set of data blocks representing the file system 110 at a particular point in time may comprise data blocks copied by the de-duplication based backup system 200 from the file system 110 at different points in time depending on when the data block was changed. The set of data blocks corresponding to the data of the file system 110(a) can be made available to the client 140 via a file-sharing system 220 that allows the client 140 to access the backup file system 210. The operation of making the set of data blocks available is called provisioning of a virtual restored file system (VRFS) corresponding to the data of the failed file system 110(a). For example, the file-sharing system 220 may provide access to the backup file system 210 via network file system (NFS) mount operation. A portion of the backup file system 210 may be NFS-mounted to the client 140, thereby allowing client 140 to access files stored on the mounted portion of the backup file system 210. The client 140 can read as well as write to the mounted portion of the backup file system 210. All or part of the file system at a specific point in time may be mounted.

The process illustrated by FIG. 2(b) eliminates the expensive data restore operation 170 illustrated in FIG. 1(b) that requires copy 170 of a large amount of data from a backup storage device. The backup file system 210 is used to store the backup copies and also can be accessed directly by the client 140 for read/write purposes. A virtual restored file system (VRFS) structure is created that allows the client 140 to access a snapshot of the data stored on the backup file system 210 that is copied from the file system 110. The time required to provision a VRFS corresponding to the failed file system 110(a) is significantly less than the time required for a restore operation 170. In an embodiment, all of the steps to mount the file system or volume can be fully automated, by having a toolkit on the target server (the toolkit comprising software modules), which has the privileges to mount the file system or volume. In an embodiment, when the production server 115(a) or file system 110(a) that previously failed starts working again, the changes made to the backup file system 210 by the client 140 are transferred to the production server 115(a) and applied to the file system 110(a). In an embodiment, applying the changes comprises copying the data blocks that were changed in the de-duplication based backup system 200 over to the file system 110a and replacing the corresponding data blocks of the file system 110a with the received data blocks. Subsequently, the client 140 can revert back to using the file system 110(a) of the production server 115(a).

Figure 3:
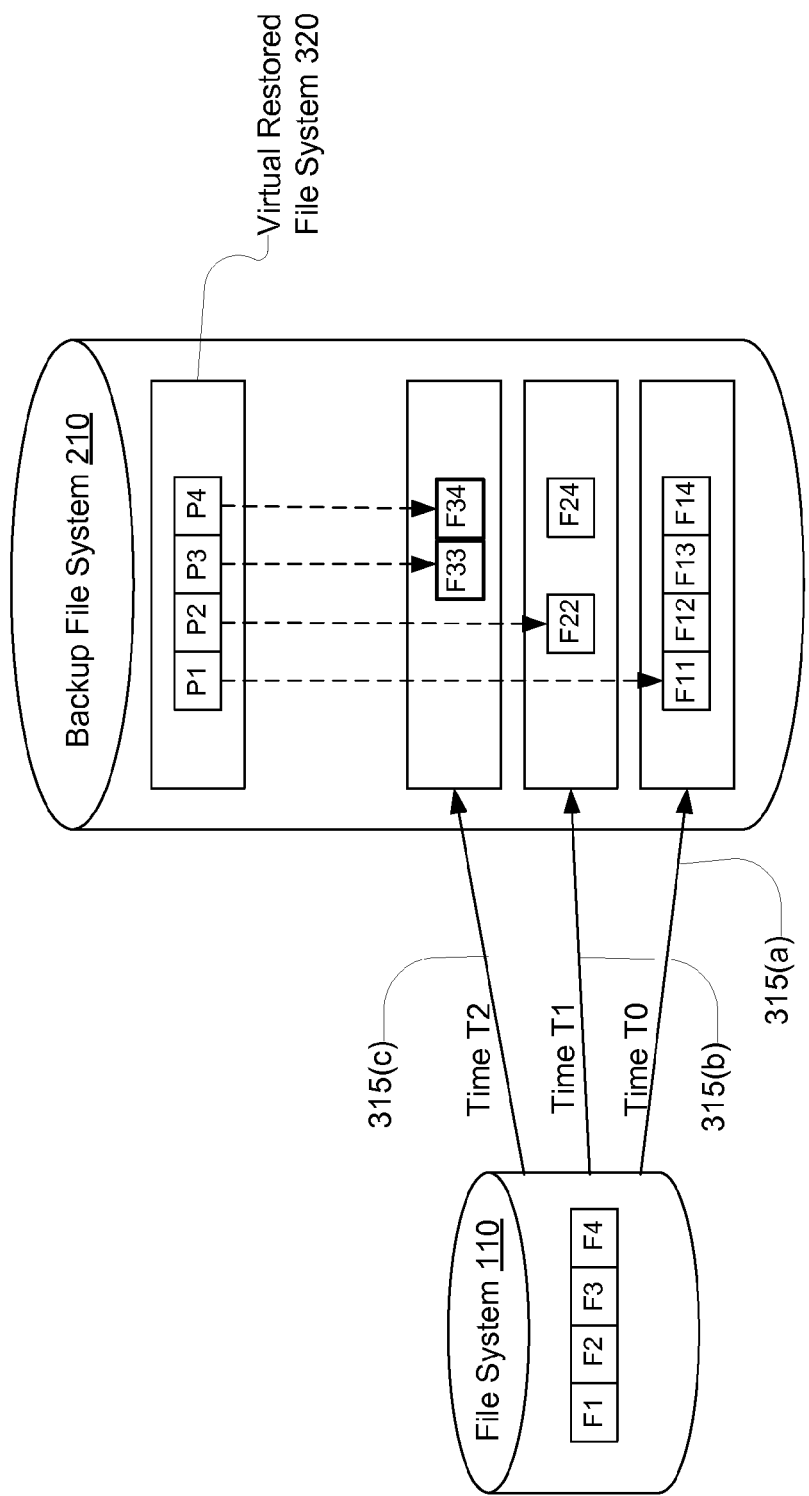
FIG. 3 is a diagram illustrating how blocks of data copied at different points in time are organized in a backup file system to allow provisioning of a VRFS, in accordance with an embodiment of the invention.

FIG. 3 is a diagram illustrating how blocks of data copied at different points in time are organized in a backup file system to allow provisioning of a VRFS. The file system 110 shown in FIG. 4 comprises data blocks F1, F2, F3, and F4. Assume time T0 is the first point-in-time at which the backup file system 210 is used to backup data from file system 110. At time T0 all blocks from the file system 110 are copied 315(a) to the backup file system and stored as data blocks F11, F12, F13, and F14 respectively. Assume that between time T0 and T1, blocks F2 and F4 are changed. At time T1, only data blocks F2 and F4 are copied 315(a) from file system 110 to the backup file system 210 and stored as blocks F22 and F24 respectively. Similarly, assuming data blocks F3 and F4 change between time T1 and T2, at time T2, these blocks are copied to the backup file system 210 and stored as blocks F33 and F34 respectively.

If the file system 110 fails after time T2, a snapshot of data from the file system 110 corresponding to the point in time T2 can be made available to a client. The data structure used for provisioning a VRFS corresponding to point T2 is shown as a set 320 of pointers to the data blocks. Each pointer P1 points at the latest copy of data block i modified before time T2. For example, pointer P1 points at data block F11 copied at time T0, pointer P2 points as block F22 copied at time T1, and pointer P3, P4 point at blocks F33, F34 copied at time T2. If the client 140 writes to a data block pointed at by the VRFS 320, a copy of the corresponding data block is made. The client 140 subsequently reads/writes to the copy of the data block. This allows the original copy of the block stored in the backup file system 210 to be saved for use by other clients, for example, to provision other VRFS structures.

Figure 4:
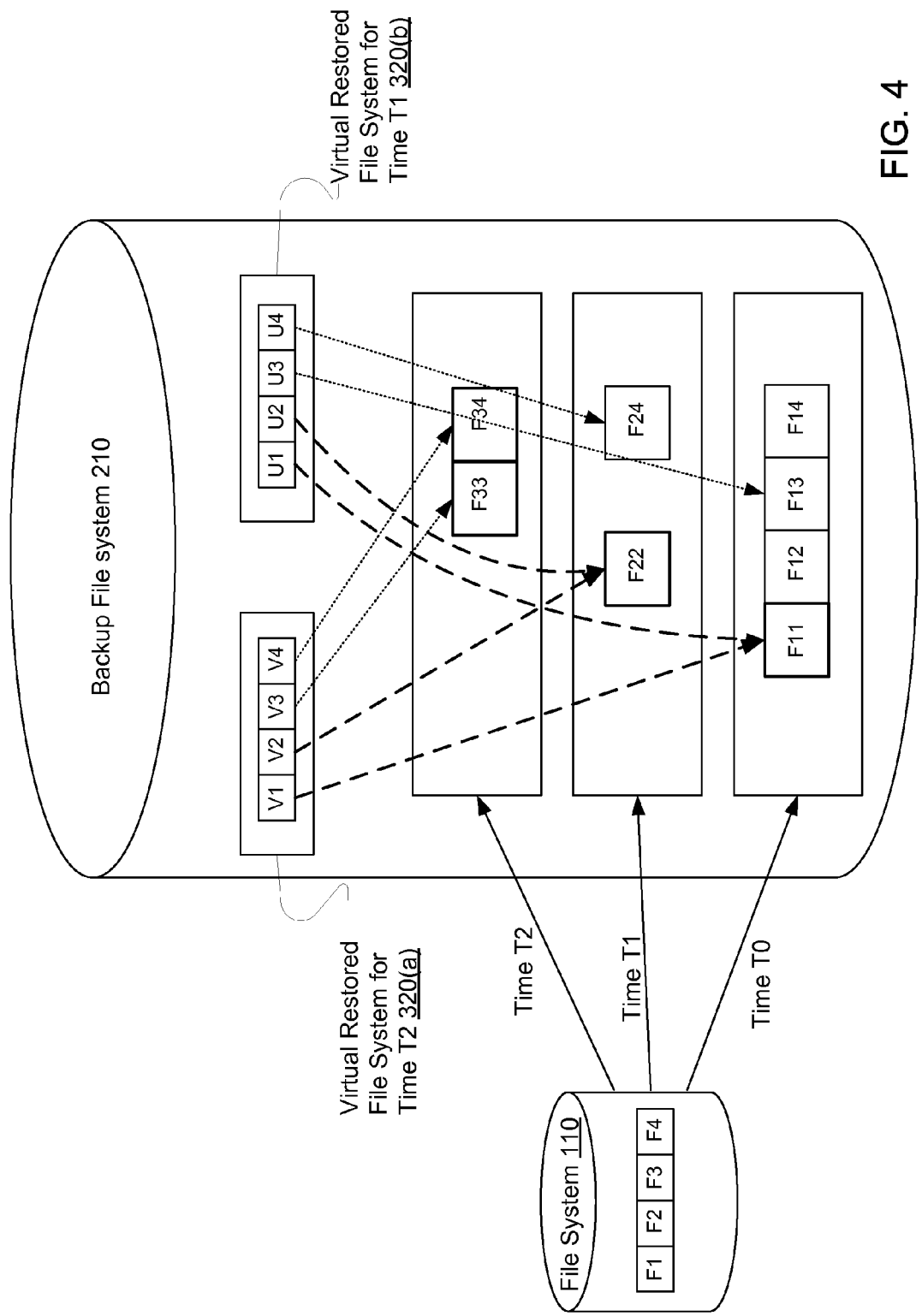
FIG. 4 illustrates how data blocks stored in a backup file system can be shared by file structures created for different VRFS structures, in accordance with an embodiment of the invention.

FIG. 4 illustrates how multiple snapshots of the file system 110 can be supported at the same time by the backup file system 210 if necessary. The VRFS 320(a) corresponding to the file system snapshot for time T2 points to the copies of data blocks obtained on or before time T2. For example, pointer V1 points to block F11 copied at time T0, pointer V2 points to block F22 copied at time T1, and pointers V3, V4 that point at blocks F33, F34 respectively. On the other hand, VRFS 320(a) corresponding to the file system snapshot for time T1 points to the latest copy of a data block copied on or before time T1. Accordingly, pointer U1 points to block F11 copied at time T0, pointer U2 points to block F22 copied at time T1, pointer U3 points to block F13 copied at time T0 and pointer U4 points at block F24 copied at time T1. Data blocks of the backup file system 210 can be shared by multiple VRFS structures corresponding to different points in time. For example, block F22 is shared by the VRFS corresponding to time T1 as well as VRFS corresponding to time T2. Furthermore, a VRFS can be shared by multiple clients 140. In one embodiment, these different points in time can all be mounted by a single target server or by multiple target servers. In one embodiment, multiple points in time can be mounted on a single server under multiple mount points or under a single mount point, with directories representing multiple points in time.

The changes made to the backup file system 210 using a VRFS 320 can be merged back to the source file system 110. However if there are multiple copies of a data block that have been updated by clients 140, the updates to the data block may conflict with each other. Merging these copies of the data block to the original file system 110 may require further analysis of the copies of the data block to determine if the same portion of the data block is updated differently in the two copies. Conflicts may have to be resolved to determine which update from a set of conflicting updates is applied to the data while merging changes from the backup file system 210 to the original file system 110.

In some embodiments, a filter driver can monitor changes to data blocks and store the history of the changes using a suitable format. In some embodiments, variable sized data segments are copied from the file system 110 to the backup file system 210. A variable sized data segments can be smaller than a complete data block if the amount of data that changed since the last copy operation is small. As a result, a copy of variable sized segments can take less time and can be performed more frequently. For example, an operation that copies all the changed blocks since a previous changed-block copy operation can be performed once a day but the backup of the history of changes can be performed every few minutes. A restore of a file system for a given time Tm can be performed by taking data blocks corresponding to the most recent block copy taken at time Tn before the time Tm. The changes corresponding to history of changes copied after Tn and before Tm can be applied to the data copied by the changed-block copy operation to obtain a snapshot of data close to a time point before time Tm. In some embodiments, combinations of variable sized data segments and fixed sized blocks are retrieved from the file system 110 and stored on the backup file system in either compressed form or without compression. In some embodiments, changed blocks representing several different points in time are stored local to the original file system, for instance if the original file system is not connected to the network, and then sent in a batch job while maintaining the information that allows recreation of the data corresponding to multiple points in time.

System Architecture

Figure 5:
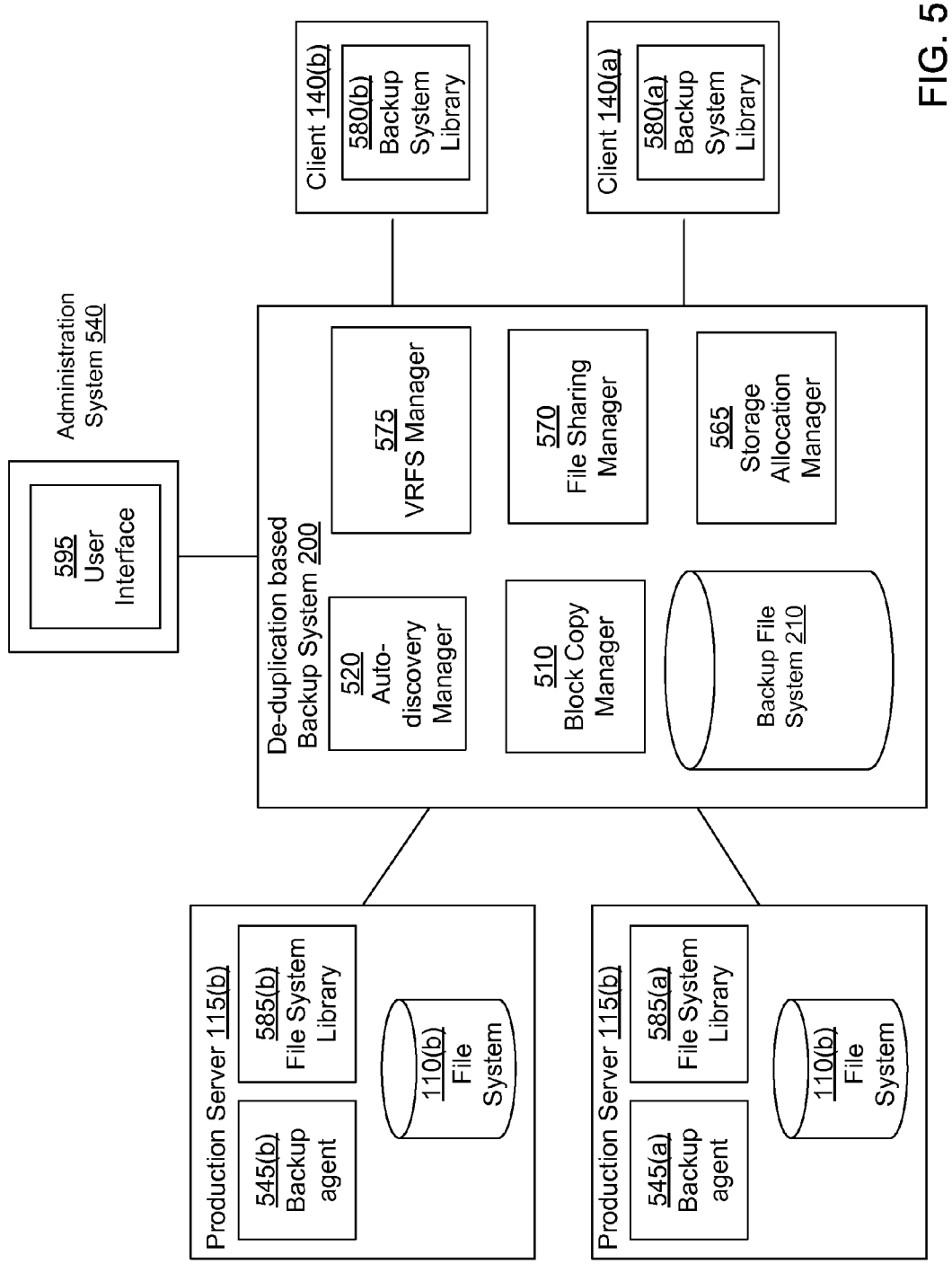
FIG. 5 illustrates a system architecture for a de-duplication based backup system, in accordance with an embodiment of the invention.

FIG. 5 shows a high level block diagram illustrating a system environment suitable for performing backups of file systems using a de-duplication based backup system 200 and making the data stored in the backup system available to clients. The system environment comprises one or more production server 115, a de-duplication based backup system 200, an administration system 540, and one or more clients 140. Systems shown in FIG. 3 can communicate with each other if necessary via a network.

A production server 115 is a computer system that performs operations on data stored in a file system 110. For example, the production server 115 may comprise an email server, or a database server, an enterprise resource planning (ERP) application, a mobile device, or any other application that stores data. In one embodiment, a production server 115 refers to any computer system that stores data on a file system 110. The production server 115 comprises a file system 110, a backup agent 345, and a file system library 385. In alternative configurations, different and/or additional modules can be included in a production server 115.

In some embodiments, the file system 110 may be a local storage of the production server 115 or a network attached storage. The file system library 385 provides APIs useful for extracting information from the file system 110. The backup system 200 calls the APIs of the file system library 385 to copy data from file system 110 to the backup system 200. In one embodiment, the backup system 200 calls the file system library 385 APIs to determine the number of blocks of the file system that changed since a given point in time to determine whether to obtain the changed blocks. In another embodiment, the backup system 200 periodically copies at a fixed interval, blocks of file system 110 that changed since the last time a similar operation was performed. In one embodiment, the file system library 385 mounts the file system 110 of the production server 115 on the de-duplication based backup system 200 using a file sharing system similar to the file-sharing system 220. Mounting file system 110 on the backup system 200 allows transfer of data stored on the file system 110 to the backup system 200 using file system APIs.

In some embodiments the de-duplication based backup system 200 comprises one or more de-duplication based backup systems 200 that share a mapping of all the blocks to prevent duplicates from being stored across all the de-duplication based backup systems 200. For example, use of multiple de-duplication based backup systems 200 provides fault-tolerance or high-availability of the systems in case of failures. In some embodiments, the de-duplication based backup systems 200 add structured redundancy via mirroring, RAID, or other mechanism to protect the data stored in the de-duplication based backup systems 200.

In some embodiments, the production server 115 includes a backup agent 545 that coordinates transfer of data blocks from the file system 110 to the de-duplication based backup system 200. For example, the backup agent 545 can periodically monitor data blocks of the file system 110 for changes to the data blocks to identify data blocks to be copied to the backup system 200. In one embodiment, the backup agent 545 writes changed blocks of file system 110 to the backup system 200 at a fixed time interval. In another embodiment, the backup agent 545 writes changed blocks of file system 110 to the backup system 200 if the number of changed blocks exceeds a threshold number or the size of the changed data exceeds a threshold value. In another embodiment all change blocks are sent as they are stored and then stored in the de-duplication backup system as a log of change blocks that can be applied to create different points in time.

Some embodiments may not include all the modules shown in FIG. 5, for example, the backup agent 345. The copy of data from the file system 110 that does not include the backup agent 545 is initiated by the block copy manager 510. These embodiments are called agent-less de-duplication based backup systems. These embodiments are beneficial since they require less maintenance for production server 115 by eliminating the installation and maintenance of the backup agent 545. In some embodiments the agent-less system requires less load on the production server 115 by eliminating the backup agent 545 that can consume system resources. On the other hand, a system that uses a backup agent 545 may require fewer communications between the de-duplication based backup system 200 and the production system 115 since the block copy manager 510 is not required to request backup data from the production server 115 each time. In a system where read/write operations on the file system 110 are less frequent, the backup agent 545 can significantly reduce the number of messages exchanged between the production server 115 and the de-duplication based backup system 200.

In one embodiment, the file system library 585 includes a filter driver that monitors all update operations of the file system 110. The filter driver monitors all the read/write operations performed on the file system 110. The filter driver includes the logic to track the updates made to the file systems and determine when to copy the updates to the backup system 200. The filter driver can copy the changed blocks of the file system 110 to the backup system 200 either on a periodic basis or when the amount of changed data or number of changed blocks exceeds a threshold.

The data stored in the backup file system 210 can be exposed to a client 140, for example, by using a file-sharing system 220. For example, the data stored in the backup file system 210 can be mounted on a computer system running the client 140. The client 140 can be an application or a program running on a computer system. The de-duplication based backup system 200 retrieves information available in the file system 110 of the production server 115 and stores it in the backup file system 210. The information retrieved from the file system 110 comprises data that changed since a previous retrieval for a subset of the file system 110 or for the entire disk storing the file system 110. In some embodiments, the file system 110 can be mounted as an iSCSI volume that represents a network disk (instead of a network file system). If the information corresponding to the entire disk is retrieved from the file system 110, the retrieved information can be used to boot or start up a new computer system. In one embodiment, the information retrieved from the file system 110 can be a portion of the file system 110 that is associated with an application, for example, an email server. In some embodiments, APIs provided by an application can be used to monitor and process changes to the file system made by the application, for example, history of changes made by the application can be obtained and stored. Systems and methods for retrieving data associated with database systems to a database storage systems are described in the U.S. application Ser. No. 12/603,541 filed on Oct. 21, 2009, which is incorporated by reference in its entirety.

In some embodiments, the information backed up from the file system 110 can include a set of one or more files. The de-duplication based backup system 200 retrieves changed blocks of data from the set of files and copies them onto the backup file system 210. In some embodiments, the production server 115 can have applications that have file handles open for files stored in the file system 110 when the block copy manager 510 or the backup agent 545 needs to copy data from the file system 110. An open file handle for a file indicates that the application can be in the process of changing the data in the file. Depending on the state of the application, the data of the file may not be in a consistent state. In these embodiments a previous state of the data blocks of the file system 110 that represents a consistent state of the file system is used to perform the backup.

The de-duplication based backup system 200 includes an auto-discovery manager 520, a VRFS manager 575, a block copy manager 510, a file sharing manager 570, a storage allocation manager 565, and a backup file system 210. In alternative configurations, different and/or additional modules can be included in the de-duplication based backup system 200. The block copy manager 510 interacts with the production server 115 by sending a request to the file system library 585 to retrieve information representing a point-in-time copy of the file system 110 or a portion of the file system 110. The block copy manager 510 stores the retrieved information in the backup file system 210. The VRFS manager 575 builds the data structures to create a virtual restored file system 420 based on blocks of data stored in the backup file system 210. The storage allocation manager 565 allocates storage for the information received to store the information in the backup file system 210. The storage allocation manager 565 keeps track of the various versions of each block of data that may be obtained from the production server 115. The storage allocation manager 565 also copies blocks of data if necessary, for example, when a client writes to a data block. If a block of data is copied for read-only purposes, the storage allocation manager 565 allocates only sufficient storage to keep a pointer of reference to the exiting block of data. However, if an attempt to write to the copied block of data is made, the storage allocation manager 565 allocates sufficient storage to make a copy of the block of data to avoid updating the original block of data. In some embodiments, the data blocks retrieved by the de-duplication based backup system 200 may be compressed or encrypted before they are stored in the backup file system 210. The compress operation transforms the data by preserving the original information but converting the format of the data so that it occupies less space when stored. The encrypt operation transforms the data to a format that cannot be read by applications that do not have the logic to decode the encrypted information.

The file sharing manager 570 allows files stored in the de-duplication based backup system 200 to be shared across computers that may be connected with the de-duplication based backup system 200 over the network. The file sharing manager 570 uses the file-sharing system 220 for sharing files with clients 140. An example of a system for sharing files is a network file system (NFS). A system for sharing files may utilize fiber channel Storage area networks (FC-SAN) or network attached storage (NAS) or combinations and variations thereof. The system for sharing files may be based on small computer system interface (SCSI) protocol, internet small computer system interface (iSCSI) protocol, fiber channel protocols or other similar and related protocols. In some embodiments, the de-duplication based backup system 200 may utilize a logical volume manager. In an embodiment, files are organized in a format emulating a given file system disk layout, such as the file system of WINDOWS operating system called NTFS or the UNIX file system (UFS).

The auto-discovery manager 520 allows the de-duplication based backup system 200 to find file systems that need backups for a giver computer system or a set of computer systems. For example, the de-duplication based backup system 200 may be provided with information identifying a computer system, for example, the network address or a machine. The de-duplication based backup system 200 can automatically discover various file systems used by the computer system that may need backup. In some embodiments, the de-duplication based backup system 200 is provided information identifying applications that need backup on the computer system. The de-duplication based backup system 200 can identify all the relevant the files that are used by the identified applications that need backup. For example, the de-duplication based backup system 200 may be requested to perform backups of an email server on a given machine. The auto-discovery manager 520 can identify the files used by the email server to store email related data as well as email server configuration information that needs to be backed up. In an embodiment, the auto-discovery manager 520 can take information identifying a set of computer systems and discover the file systems associated with all the computer systems that need backup. In some embodiments, the auto-discovery manager 520 is provided access to a network to perform discovery of various machines on the network including desktop computers, laptop computers, servers etc. and the file systems on the discovered computers for which backup needs to be performed. In an embodiment, the information discovered by the auto-discovery manager 520 is reviewed by a system administrator to determine the set of file systems that need to be backed up to the backup file system 210.

The administration system 540 comprises a user interface 595 that allows a system administrator to perform administrative operations for example, specifying production systems that need to be backed up or client systems 140 that need access to the backup file system 210 in case of data loss. In some embodiments, the user interface 595 allows a system administrator to configure parameters for the auto-discovery manager 520 to perform discovery of file systems 110 for backup. The user interface 595 also allows a system administrator to specify the frequency at which data is copied from the production server 115 for performing backup.

Figure 6:
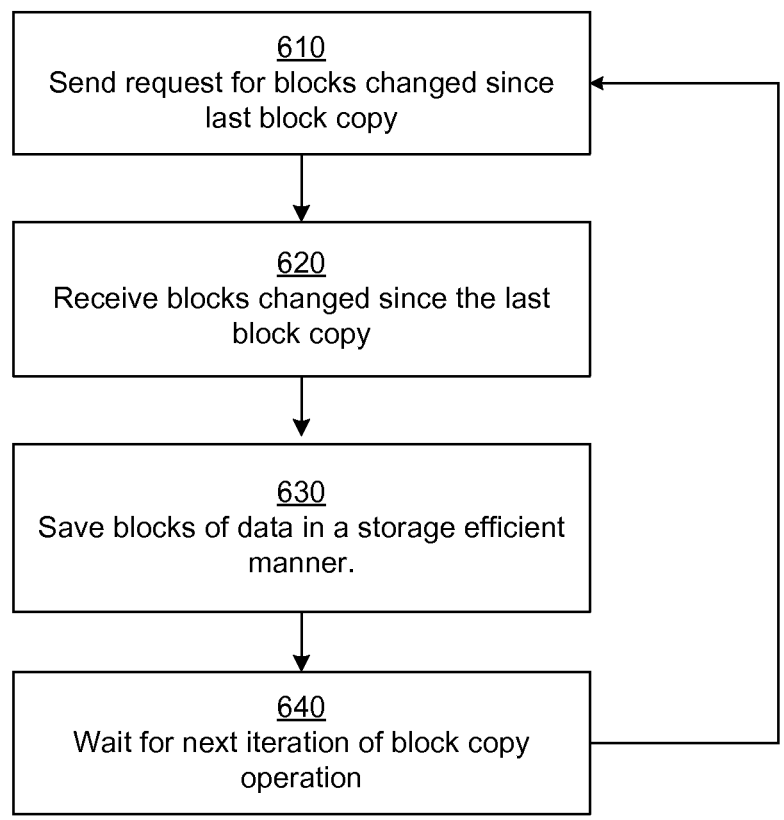
FIG. 6 is a flowchart of a process for receiving data from a production server for performing backups using a de-duplication based backup system, in accordance with an embodiment of the invention.

FIG. 6 shows a flowchart of the process illustrating how a block copy manager 510 receives changed blocks from the production server 115 and saves them. The block copy manager 510 sends 610 a request for blocks changed since a previous changed-block copy operation to the production server 115. In some embodiments, the request may include information identifying the files for which change information is retrieved or information identifying a portion of the file system 110 for which changed blocks need to be retrieved. In some embodiments, the request comprises a remote call to execute instructions (or code) in the file system library 585. The file system library 585 executes instructions to identify the changed data blocks and sends the requested data to the de-duplication based backup system 200. The block copy manager 510 receives 620 the information comprising the changed blocks. The block copy manager 510 requests the storage allocation manager 565 to save 630 the blocks of data in a storage efficient manner. The block copy manager 510 waits for the next iteration of the changed-block copy operation and repeats the above steps after the waiting period. In one embodiment special processing can be applied either before, during, or after the backup process or before, during, or after the mounting process to make a point-in-time copy available. Special processes can include but are not be limited to encryption, identification and elimination of confidential data, elimination of unnecessary or temporary data (such as empty blocks), or other processes.

In some embodiments, the backup agent 545 of the production server 115 determines whether to initiate the changed-block copy operation. For example, the backup agent 545 can monitor the changes made to a portion of the file system 110, for example, a set of files. If the amount of changes as measured by the number of blocks changed or an amount of information indicating history of changes exceeds a threshold value, the backup agent may determine that a changed-block copy operation needs to be initiated. In another embodiment, even though the amount of changes may not exceed a threshold value, the backup agent 545 may initiate a changed-block copy operation if the time since a previous changed-block copy operation exceeds a threshold value. The backup agent can send the information comprising changed blocks of data or history of changes to the block copy manager 510. The block copy manager 510 sends a request to the storage allocation manager 565 to save the information. The storage allocation manager 565 saves the information in the backup file system 210.

Figure 7:
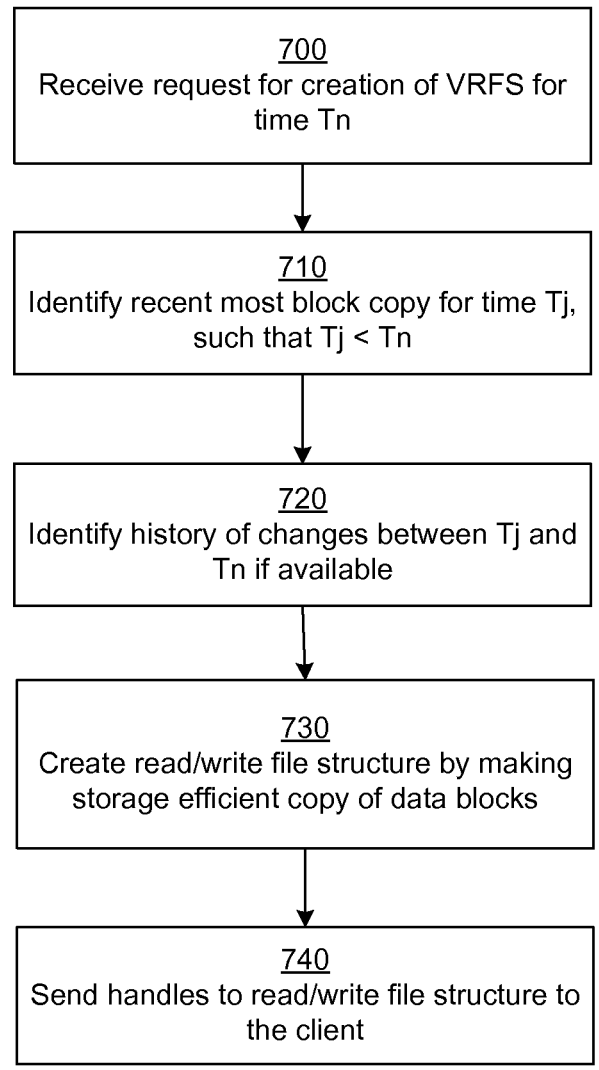
FIG. 7 is a flowchart of a process for provisioning a VRFS structure corresponding to a given point-in-time, in accordance with an embodiment of the invention.

FIG. 7 illustrates how a virtual restored file system structure can be created for a client 140 based on the backup information saved in the backup file system 210. The VRFS manager 575 receives 700 a request to create a VRFS for a given time point Tn, for example, in case there is a failure of a file system 110 that was backed up. The VRFS manager 575 identifies 710 the recent most block copy for a time point Tj that is before time Tn. In some embodiments, if information describing history of changes that occurred between the time periods Tj and Tn is available, the information is identified 720. Based on the block copy for time point Tj and the history of changes, a read write file structure is created 730 by making storage efficient copy of data blocks. For example, the file structure may include pointers to blocks of data stored in backup file system 210. In some embodiments, data changes based on history of changes are applied to the blocks of data to obtain a copy of the data block corresponding to a more recent point in time compared to Tj. A handle to the file structure created is sent 740 to the client 140. The client can perform read or write operations using the VRFS file structure.

Alternative Embodiments

In some embodiments, the de-duplication based backup system 200 can be used as a production system in case the original production server 115 fails. The de-duplication based backup system 200 provides a consolidated storage system for several applications or file systems from several computer systems. All applications that can be executed on the original file systems 110 can be executed using the backup file system 210. If backup file system 210 is used as a consolidated file system, use of a high-performance storage device (for example, solid-state drive (SSD)) to store the backup file system 210 improves the performance of all the clients 140 using the data stored in the backup file system 210. This allows the enterprise to improve performance of several clients 140 by investing in a single consolidated system instead of a large number of individual systems. For example, replacing the hard drives on several machines by SSD can be lot more expensive than replacing the drive of a single consolidated system. In some embodiments, the backup file system 210 can be used as a high-availability system that can be used by clients, for example, when the production server 115 is not available, even if there is no loss of data stored in file system 110.

In some embodiments added storage caching layers can improve the performance of the backup file system, especially if multiple blocks are shared across different systems accessing different points in time or different file systems.

The entire backup file system 210 can be copied to a conventional backup storage for performing a backup of the backup file system 210 (for example, as shown in FIG. 1). As a result, a conventional backup storage operation can also be performed for a set of file systems 110. The backup of the backup file system 210 using conventional backup techniques can be much simpler process than performing individual backups of all the file systems 110 of the various production servers 115 of an enterprise. This simplicity is obtained due to the fact that a single system is being backed up and also because the amount of data being backed up is smaller since it represents only the changed blocks of data from the original file systems which can be further reduced in size by using data compression. In some embodiments the backup file system can be replicated in whole or in part to another storage device.

In some embodiments, instead of creating a VRFS structure for a client to use, the data represented by the VRFS can be exported to a different file system and the client allowed to access the exported data stored in the other file system. Exporting the VRFS data can be beneficial, for example, if the applications using the data require large amount resources that are not available in the de-duplication based backup system 200.

Computing Machine Architecture

Figure 8:
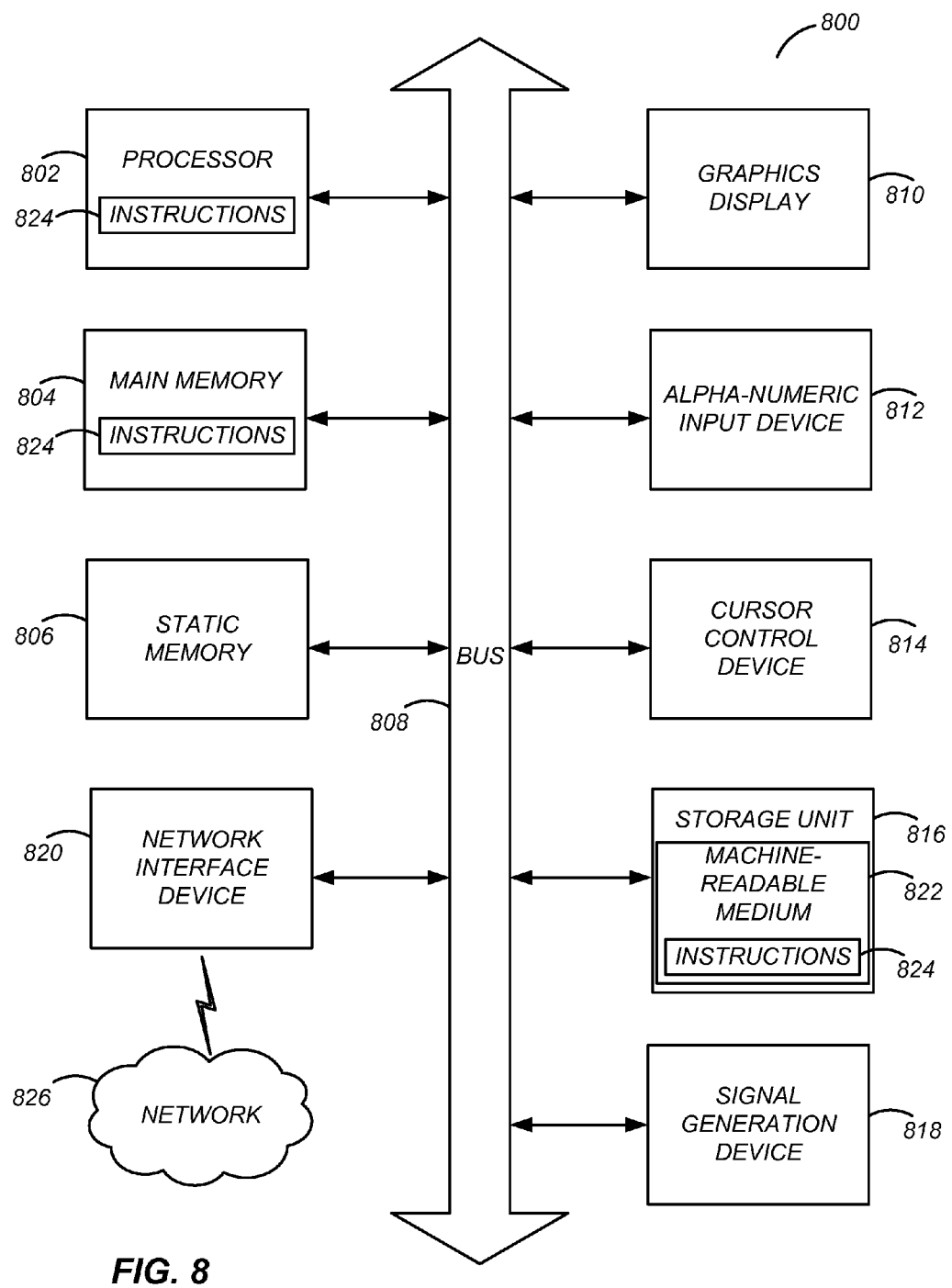
FIG. 8 illustrates an embodiment of a computing machine that can read instructions from a machine-readable medium and execute the instructions in a processor or controller.

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method for performing backup of file systems, the method comprising:
   receiving, by a storage system, data blocks for a plurality of point-in-time copies of a source file system, each point-in-time copy of the source file-system obtained by extracting data blocks from the source file-system, the source file system comprising at least a source file;
   storing, by the storage system, the received data blocks, wherein one or more stored data blocks associated with a point-in-time copy are shared with other point-in-time copies, wherein the storage system transforms data of a received data block to a format distinct from a format of the received data block and stores the transformed data;
   receiving a first request to restore information associated with a first point-in-time copy for a first target system;
   responsive to receiving the request to restore information obtained from the source file system, provisioning a first virtual restored file system comprising a set of files including a restored file corresponding to the source file, the restored file comprising a plurality of stored data blocks, the plurality of stored data blocks comprising stored data blocks associated with two or more distinct point-in-time copies, the provisioning comprising:
      mounting the set of files to the first target system to provide read and write access to the set of files, the mounted set of files comprising the first virtual restored file system;
   receiving a second request to restore information associated with a second point-in-time copy for a second target system; and
   responsive to receiving the second request, provisioning a second virtual restored file system, wherein the second virtual restored file system shares one or more data blocks with the first virtual restored file system.

2. The method of claim 1, wherein the plurality of point-in-time copies of the source file system are received based on a predetermined schedule associated with the source file system.

3. The method of claim 1, wherein the received data blocks comprise changed blocks from the source file system since a previous point-in-time copy was obtained.

4. The method of claim 1, further comprising:
   receiving a request to write data to the first virtual restored file system;
   identifying a stored data block associated with the first virtual restored file system;
   creating a copy of the stored data block and associating the stored data block with the first virtual restored file system; and
   updating the copy of the stored data block based on the request to write.

5. The method of claim 1, wherein the storage system is a first storage system, the method comprising:
   receiving a request to export the first virtual restored file system to a second storage system; and
   sending the plurality of stored data blocks to the second storage system.

6. The method of claim 1, wherein transforming the data of a received data block comprises compressing data stored in the received data block.

7. A computer-readable storage medium storing computer-executable code comprising instructions for performing backup of file systems, the code comprising:
   a block copy manager configured to:
      receive data blocks for a plurality of point-in-time copies of a source file system, each point-in-time copy of the source file-system obtained by extracting data blocks from the source file-system, the source file system comprising at least a source file;
a storage allocation manager module configured to:
store the received data blocks on a storage system, wherein one or more stored data blocks associated with a point-in-time copy are shared with other point-in-time copies, wherein instructions to store comprise instructions to: transform data of a received data block to a format distinct from a format of the received data block, and store the transformed data;
a virtual restored file system manager configured to:
receive a first request to restore information associated with a first point-in-time copy for a first target system;
responsive to receiving the request to restore information obtained from the source file system, provision a first virtual restored file system comprising a set of files including a restored file corresponding to the source file, the restored file comprising a plurality of stored data blocks, the plurality of stored data blocks comprising stored data blocks associated with two or more distinct point-in-time copies, wherein instructions to provision comprise instructions to:
mount the set of files to the first target system to provide read and write access to the set of files, the mounted set of files comprising the first virtual restored file system;
receive a second request to restore information associated with a second point-in-time copy for a second target system; and
responsive to receiving the second request, provision a second virtual restored file system, wherein the second virtual restored file system shares one or more data blocks with the first virtual restored file system.

8. The computer-readable storage medium of claim 7, wherein the plurality of point-in-time copies of the source file system are received based on a predetermined schedule associated with the source file system.

9. The computer-readable storage medium of claim 7, wherein the received data blocks comprise changed blocks from the source file system since a previous point-in-time copy was obtained.

10. The computer-readable storage medium of claim 7, wherein the virtual restored file system manager is further configured to:
receive a request to write data to the first virtual restored file system;
identify a stored data block associated with the first virtual restored file system;
create a copy of the stored data block and associating the stored data block with the first virtual restored file system; and
update the copy of the stored data block based on the request to write.

11. The computer-readable storage medium of claim 7, wherein the storage system is a first storage system, wherein the virtual restored file system manager is further configured to:
receive a request to export the first virtual restored file system to a second storage system; and
send the plurality of stored data blocks to the second storage system.

12. The computer-readable storage medium of claim 7, wherein transforming the data of a received data block comprises compressing data stored in the received data block.

13. A computer-implemented system for performing backup of file systems, the system comprising:
one or more computer processors; and
one or more computer-readable storage mediums storing computer program modules configured to execute on the one or more computer processors, the computer program modules comprising at least:
a block copy manager configured to:
receive data blocks for a plurality of point-in-time copies of a source file system, each point-in-time copy of the source file-system obtained by extracting data blocks from the source file-system, the source file system comprising at least a source file;
a storage allocation manager module configured to:
store the received data blocks on a storage system, wherein one or more stored data blocks associated with a point-in-time copy are shared with other point-in-time copies, wherein instructions to store comprise instructions to: transform data of a received data block to a format distinct from a format of the received data block, and store the transformed data;
a virtual restored file system manager configured to:
receive a first request to restore information associated with a first point-in-time copy for a first target system;
responsive to receiving the request to restore information obtained from the source file system, provision a first virtual restored file system comprising a set of files including a restored file corresponding to the source file, the restored file comprising a plurality of stored data blocks, the plurality of stored data blocks comprising stored data blocks associated with two or more distinct point-in-time copies, wherein instructions to provision comprise instructions to:
mount the set of files to the first target system to provide read and write access to the set of files, the mounted set of files comprising the first virtual restored file system;
receive a second request to restore information associated with a second point-in-time copy for a second target system; and
responsive to receiving the second request, provision a second virtual restored file system, wherein the second virtual restored file system shares one or more data blocks with the first virtual restored file system.

14. The computer-implemented system of claim 13, wherein the plurality of point-in-time copies of the source file system are received based on a predetermined schedule associated with the source file system.

15. The computer-implemented system of claim 13, wherein the received data blocks comprise changed blocks from the source file system since a previous point-in-time copy was obtained.

16. The computer-implemented system of claim 13, wherein the virtual restored file system manager is further configured to:
receive a request to write data to the first virtual restored file system;
identify a stored data block associated with the first virtual restored file system;
create a copy of the stored data block and associating the stored data block with the first virtual restored file system; and
update the copy of the stored data block based on the request to write.

17. The computer-implemented system of claim 13, wherein the storage system is a first storage system, wherein the virtual restored file system manager is further configured to:
  receive a request to export the first virtual restored file system to a second storage system; and
  send the plurality of stored data blocks to the second storage system.

18. The computer-implemented system of claim 13, wherein transforming the data of a received data block comprises compressing data stored in the received data block.

* * * * *